(12) United States Patent
McClannahan et al.

(10) Patent No.: US 7,043,611 B2
(45) Date of Patent: May 9, 2006

(54) RECONFIGURABLE MEMORY CONTROLLER

(75) Inventors: Gary P. McClannahan, Rochester, MN (US); Gary S. Delp, Rochester, MN (US); George W. Nation, Eyota, MN (US)

(73) Assignee: LSI Logic Corporation, Milpitas, CA (US)

( * ) Notice: Subject to any disclaimer, the term of this patent is extended or adjusted under 35 U.S.C. 154(b) by 410 days.

(21) Appl. No.: 10/316,510

(22) Filed: Dec. 11, 2002

(65) Prior Publication Data

US 2004/0117566 A1 Jun. 17, 2004

(51) Int. Cl.
*G06F 12/00* (2006.01)

(52) U.S. Cl. .................. 711/154; 711/156; 711/163; 711/170; 326/39

(58) Field of Classification Search ............... 711/154, 711/156, 163, 170; 326/39
See application file for complete search history.

(56) References Cited

U.S. PATENT DOCUMENTS 6,292,409 B1    9/2001  Smith ................ 365/189.11
6,334,174 B1   12/2001  Delp et al. ................ 711/167
6,438,670 B1    8/2002  McClannahan ............. 711/167
6,851,035 B1 *  2/2005  Zhou et al. ................ 711/201

OTHER PUBLICATIONS

Wittig et al., "OneChip: An FPGA Processor With Reconfigurable Logic," pp. 126-135, IEEE, Sep. 1996.*
Hauck, "The Roles of FPGA's in Reprogrammable Systems," pp. 615-638, IEEE, Apr. 1998.*
Meeting High-Performance Memory Requirements for SOC Designs, Rev. Jan. 2002.

* cited by examiner

*Primary Examiner*—Stephen C. Elmore
(74) *Attorney, Agent, or Firm*—Suiter-West-Swantz PC LLO

(57) ABSTRACT

A reconfigurable memory controller includes a plurality of communicatively coupled memory controllers. The plurality of memory controllers may be configured into a first configuration based on a grouping of memory controllers and then reconfigured into a second configuration based on a different grouping of memory controllers, where the first and second configurations have different performance bandwidths for accessing memory.

17 Claims, 8 Drawing Sheets

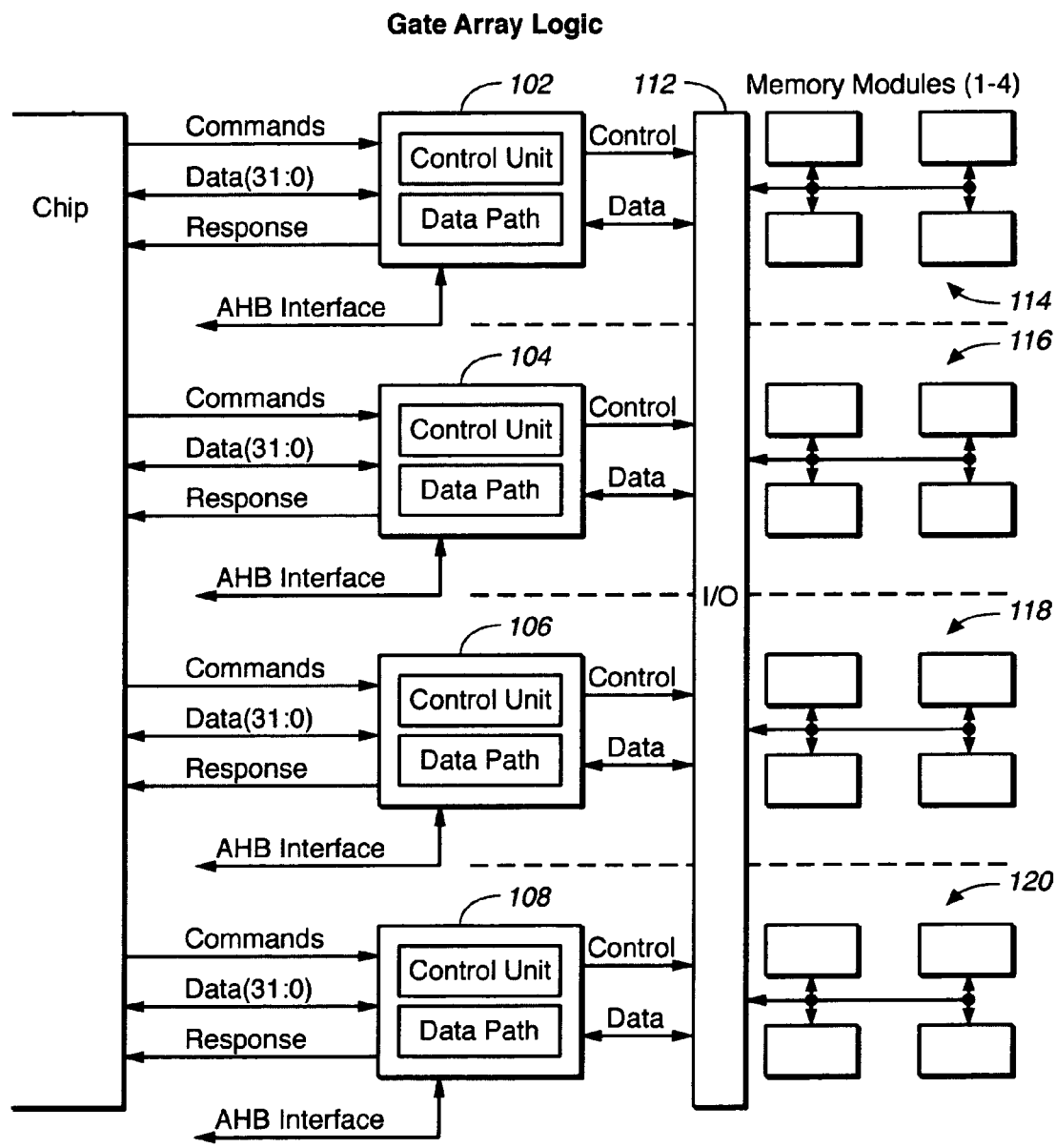
FIG._1

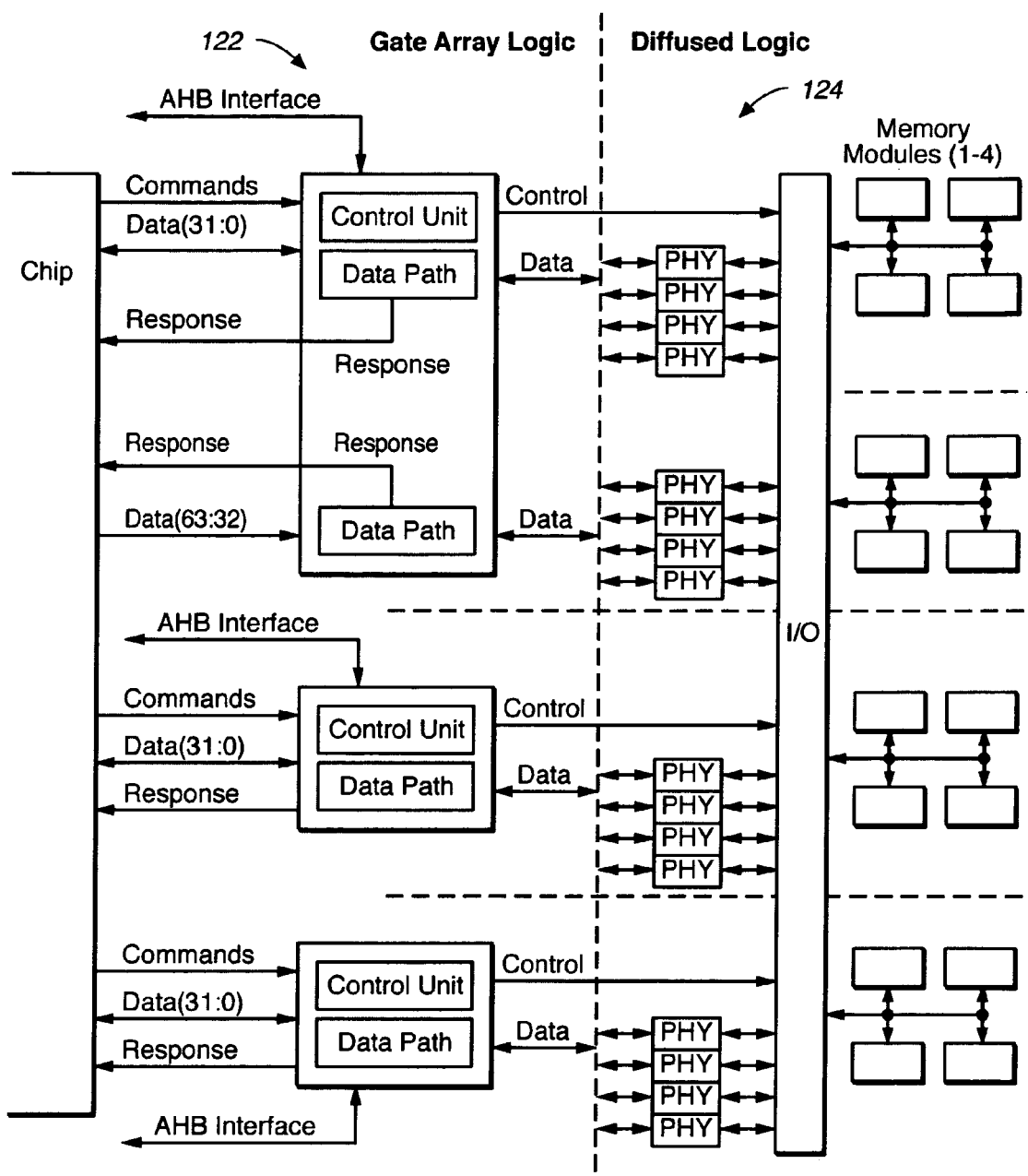
FIG._2

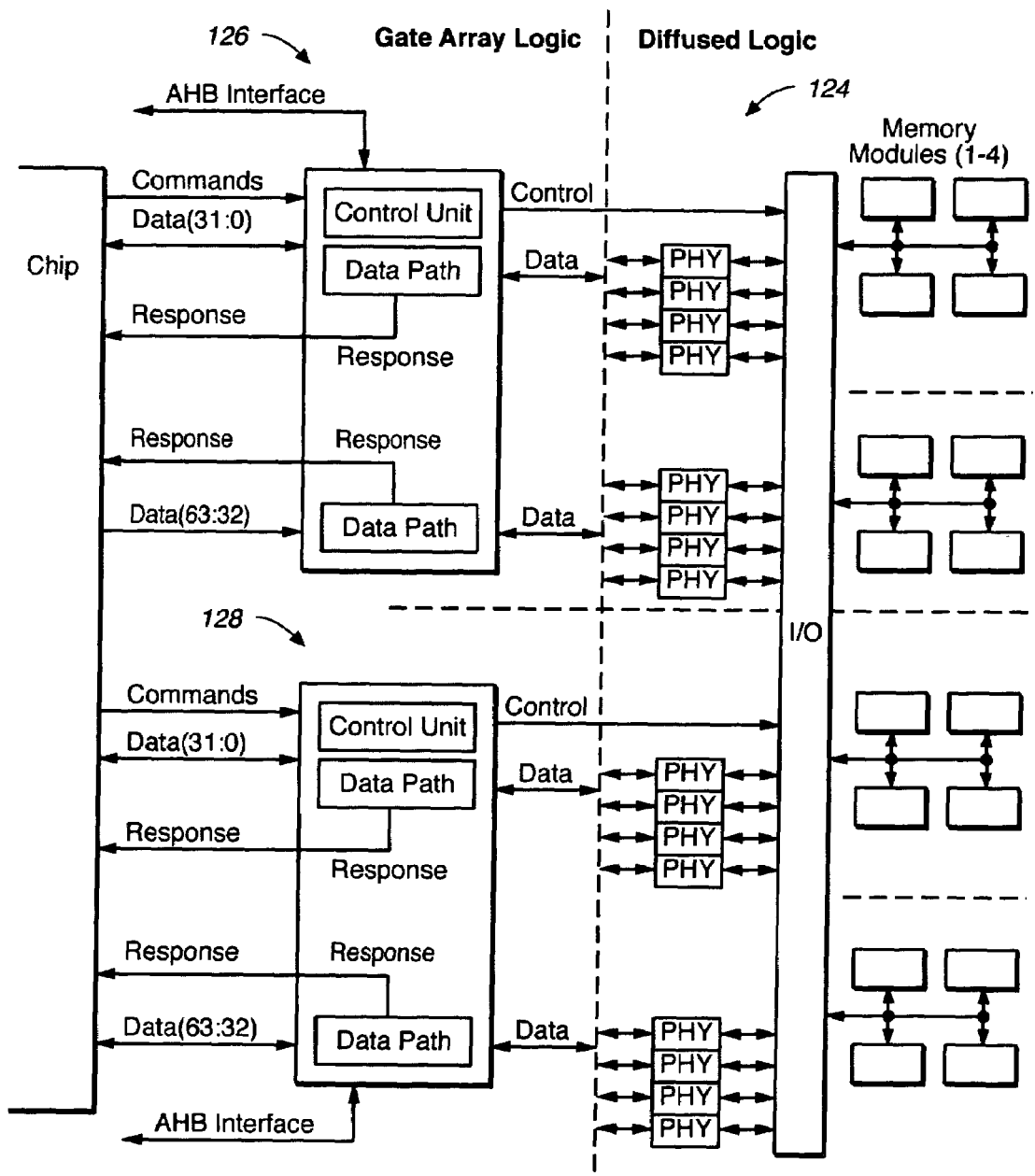
FIG._3

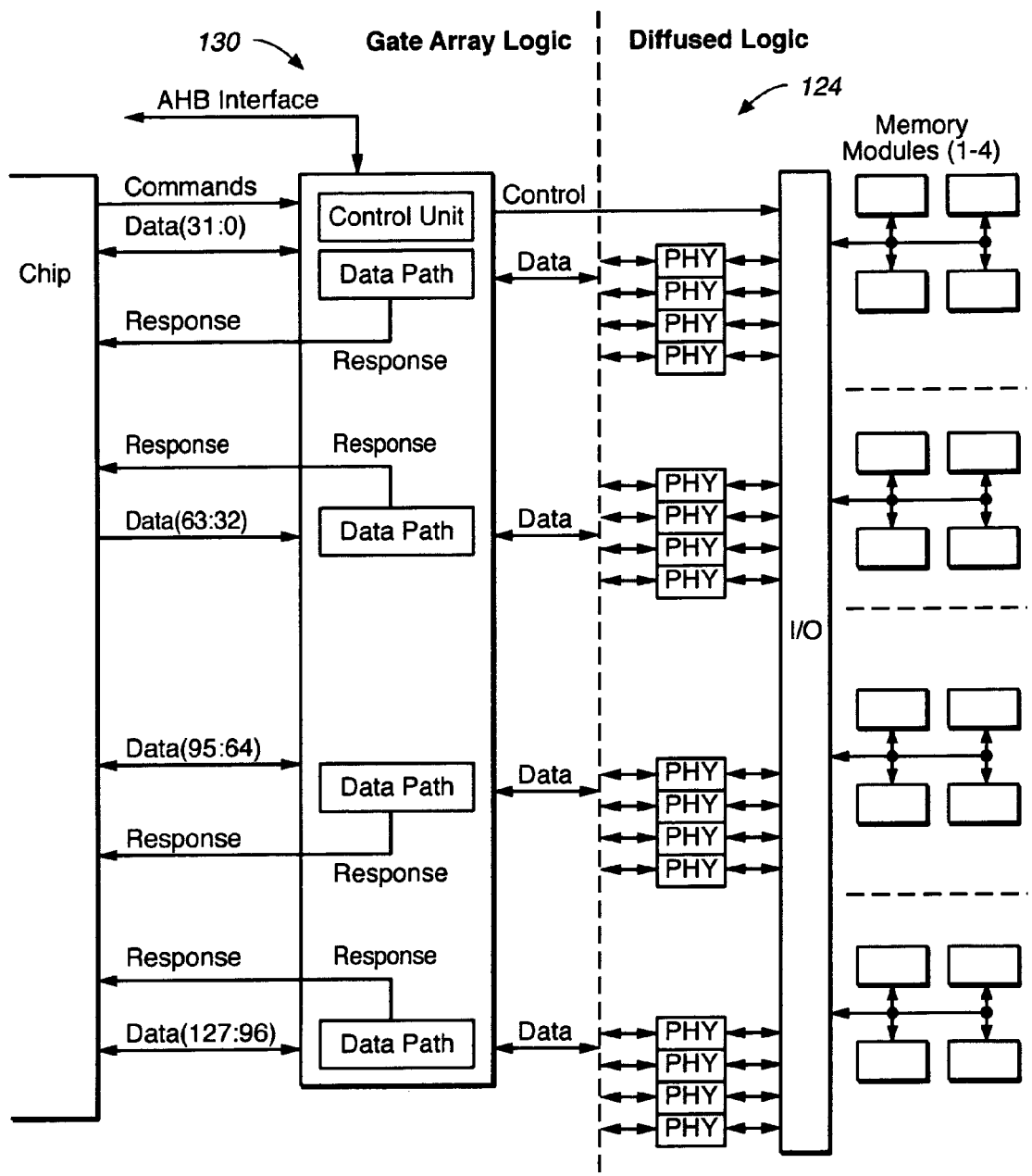
FIG._4

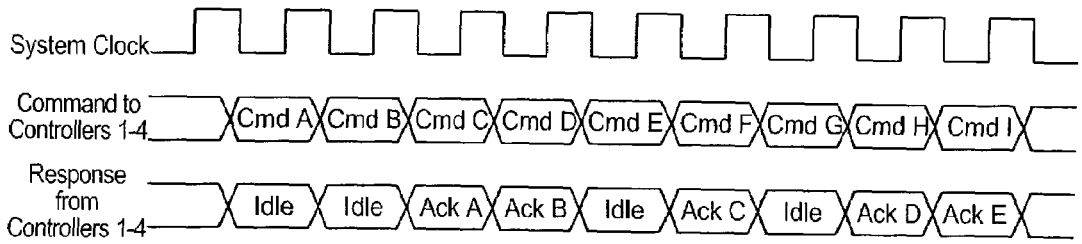
FIG._5
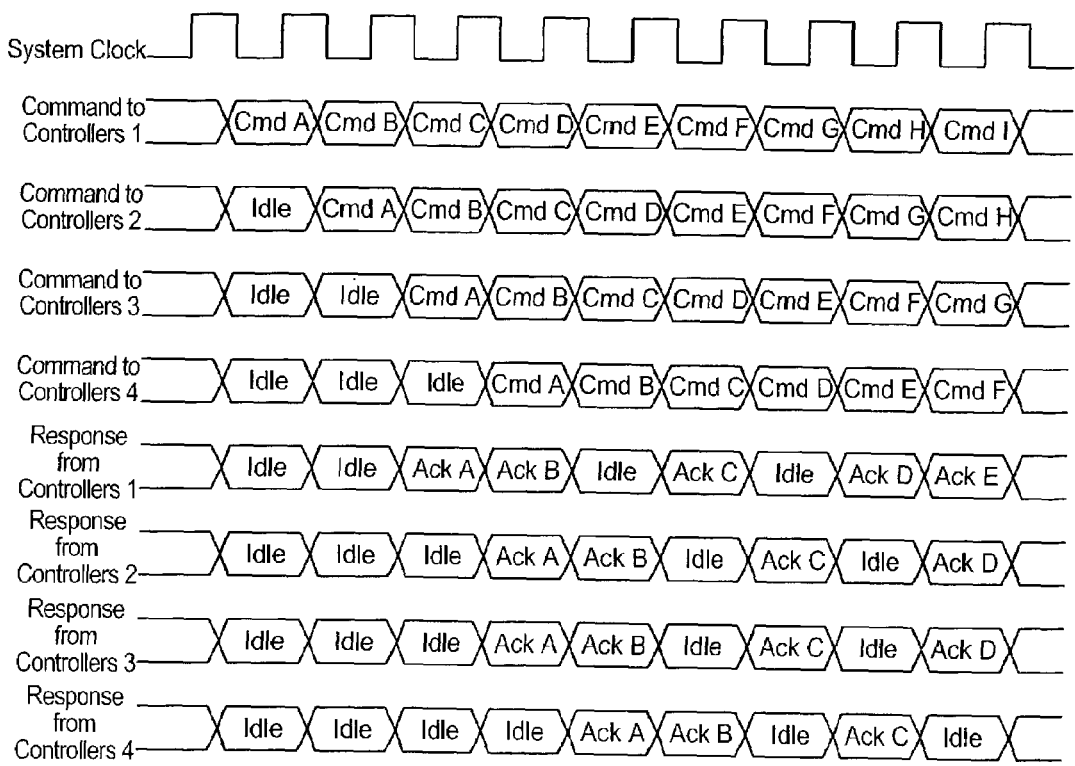
FIG._6

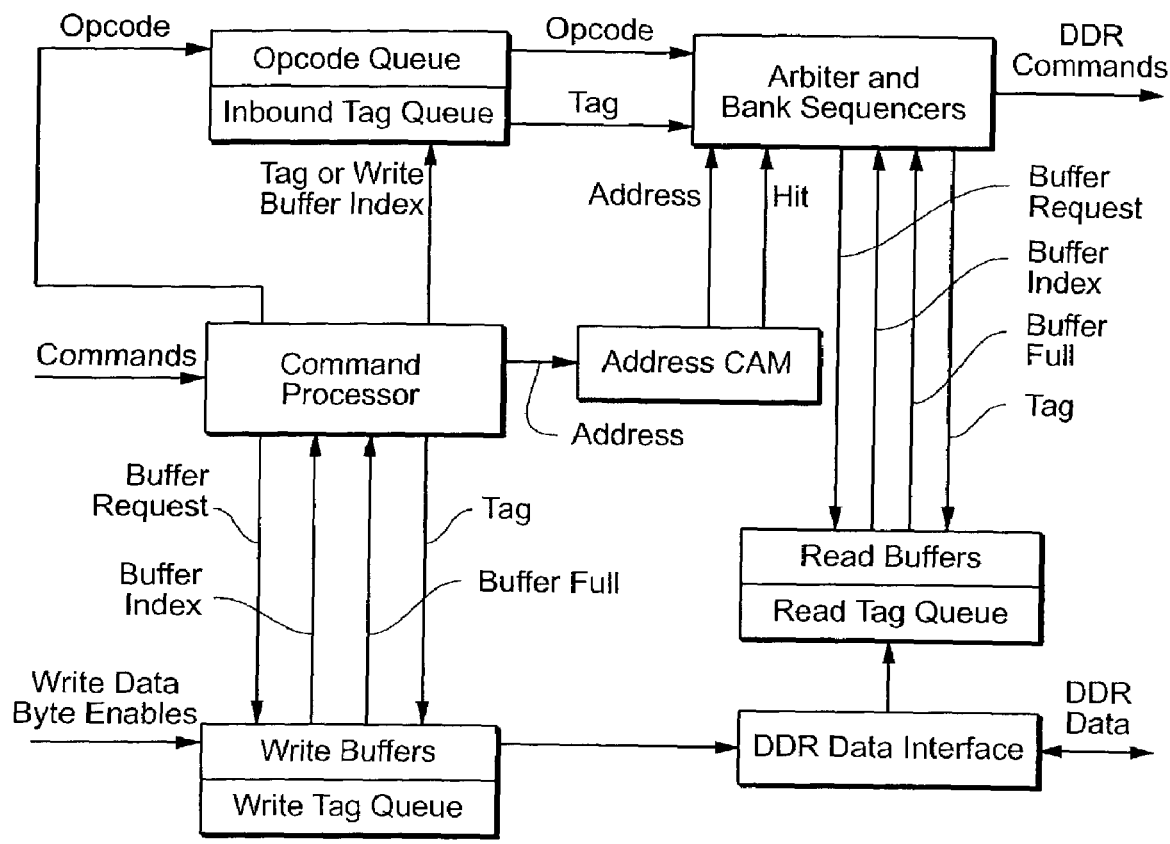
FIG._7

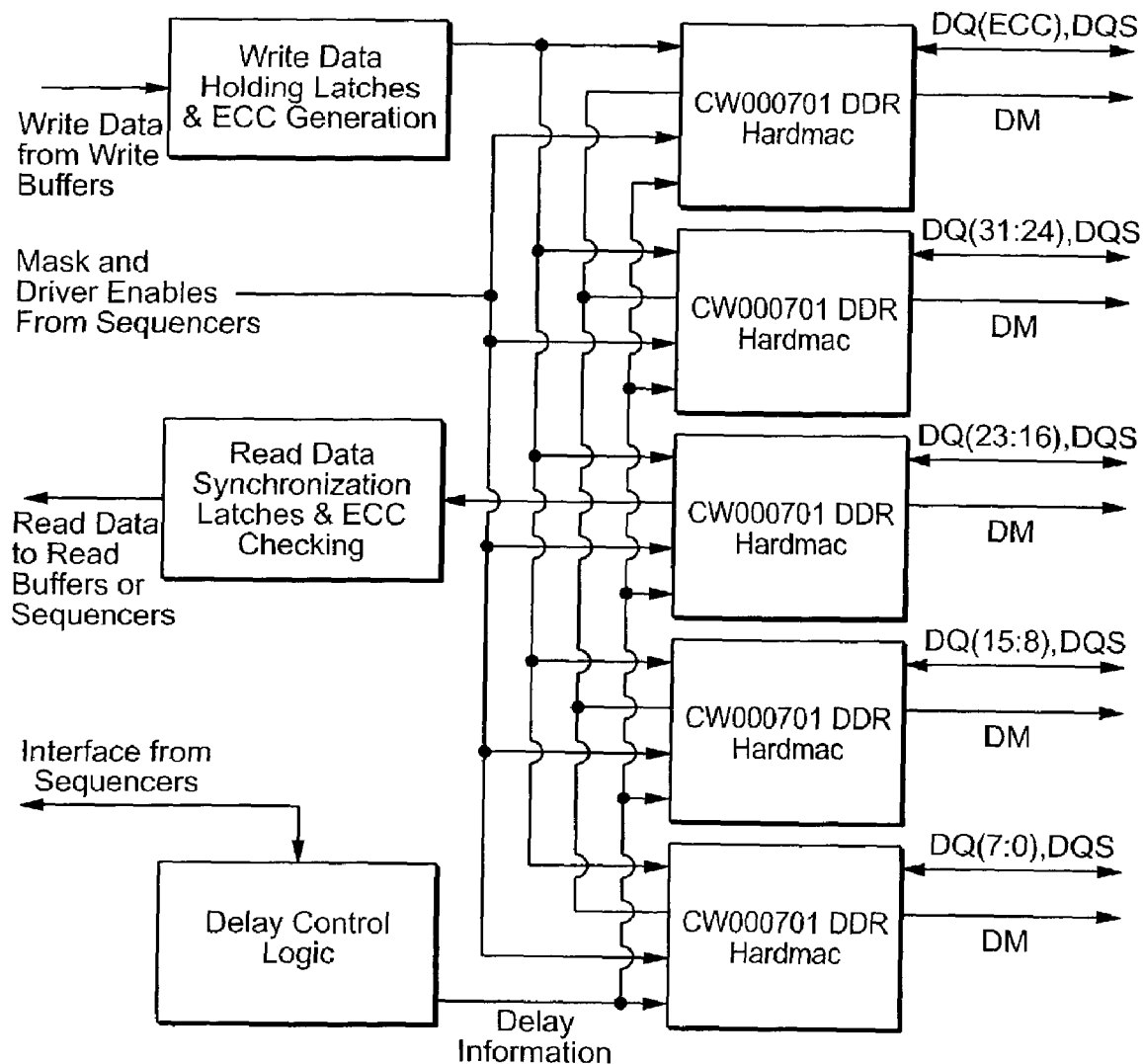
FIG._8

Read Command
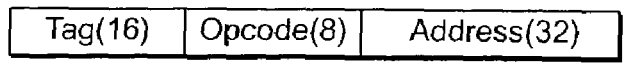
Fence Command
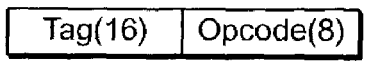
Write/Partial Write Command (Command1)
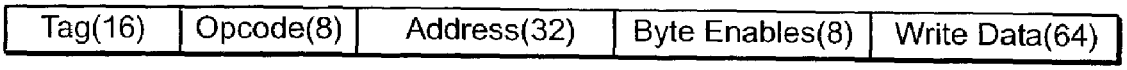
Write/Partial Write Command (Command2)
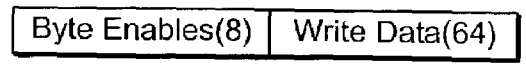
Increment Command
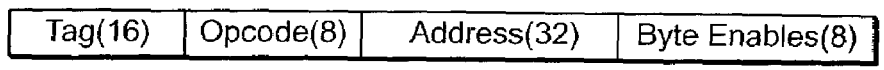
FIG._9
Response
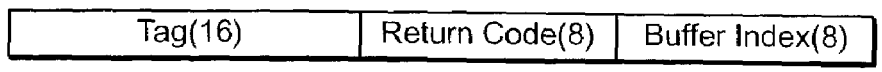
FIG._10

RECONFIGURABLE MEMORY CONTROLLER

FIELD OF THE INVENTION

The present invention generally relates to the field of electronic memories, and particularly to a reconfigurable memory controller.

BACKGROUND OF THE INVENTION

Information handling systems, such as desktop computers, servers, digital information appliances, and the like, rely on memories to store information used by such systems in performing tasks. A memory may be used, for example, to store a portion of a computer program that is executed by a computer, as well as the data that is operated upon by the computer. Thus, the reading and writing of data to a memory may have a profound impact on the operation of an information handling system.

A dedicated memory controller may be provided to handle the data transfer to and from memory storage devices. Previously, to control data transfer with a given type of memory storage device, a memory controller must often be specifically tailored to meet the various parameters for that device.

Some memory controllers, however, may need to be used with different types of memory storage devices. For example, it may be desirable to support multiple types of memory storage devices so that the memory controller may be used in different applications.

Additionally, in programmable chip platforms (e.g., field-programmable, metal-programmable, and the like) it may be desirable to place custom DRAM transceivers on the chip for connection to external DRAMs. It is also useful to place minimal controller logic for the chip IOs to manage technology-specific timing-critical aspects of DRAM.

Therefore, it would be desirable to provide a solution to the problem of defining a framework for a configurable, flexible memory controller (i.e., a reconfigurable memory controller) that may be customized to work as one or several distinct memory controllers having a useful set of features.

SUMMARY OF THE INVENTION

Accordingly, the present invention is directed to a reconfigurable memory controller. In an aspect of the present invention, a reconfigurable memory controller includes a plurality of communicatively coupled memory controllers. The plurality of communicatively coupled memory controllers is reconfigurable so that the controllers are groupable into a first memory configuration and a second memory configuration. The first memory configuration has a different bandwidth grouping than the second memory configuration.

In an additional aspect of the present invention, a reconfigurable memory controller includes a plurality of communicatively coupled memory controllers including a first memory controller, a second memory controller, and a third memory controller. The plurality of communicatively coupled memory controllers are reconfigurable so that the first memory controller and the second memory controller are groupable into a first memory configuration, and the first memory controller and the third memory controller are groupable into a second memory configuration. The first memory configuration is distinct from the second memory configuration.

In a further aspect of the present invention, a system includes a programmable chip platform and an external memory communicatively coupled to the programmable chip platform. The programmable chip platform has a reconfigurable memory controller including a plurality of communicatively coupled memory controllers. The plurality of communicatively coupled memory controllers is flexibly configurable so that the controllers are groupable into a first memory configuration and a second memory configuration. The first memory configuration has a different bandwidth grouping than the second memory configuration.

In an aspect of the present invention, a method for reconfiguring a memory controller to support different configurations includes providing a reconfigurable memory controller having a plurality of communicatively coupled memory controllers which are groupable. The plurality of communicatively coupled memory controllers are configured into a first memory configuration, the first memory configuration having a first grouping of memory controllers and a second grouping of memory controllers. The first grouping of memory controllers has a first bandwidth and the second grouping of memory controllers have a second bandwidth. The plurality of communicatively coupled memory controllers are then reconfigured into a second memory configuration, the second memory configuration having a third grouping of memory controllers and a fourth grouping of memory controllers. The third grouping of memory controllers has a third bandwidth and the fourth grouping of memory controllers has a fourth bandwidth. The bandwidths as grouped by the first grouping and the second grouping of the first memory configuration are different from the bandwidths of the third grouping and the fourth grouping of the second memory configuration.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is an illustration of an exemplary embodiment of a reconfigurable memory controller of the present invention;

FIG. 2 is an illustration of an exemplary embodiment of a reconfigurable memory controller of the present invention wherein two of the 32-bit controllers of FIG. 1 have been combined into a single 64-bit controller;

FIG. 3 is an illustration of an exemplary embodiment of the present invention wherein the four 32-bit controllers have been combined into two 64-bit controllers;

FIG. 4 is an illustration of an exemplary embodiment of the present invention wherein four 32-bit controllers of FIG. 1 have been combined into one 128-bit controller;

FIG. 5 is a depiction of an exemplary non-pipelined operation mode;

FIG. 6 is a depiction of an exemplary pipelined operation mode of a plurality of controllers of the present invention;

FIG. 7 is an illustration of an exemplary embodiment of the present invention in which generalized controller flow is shown;

FIG. 8 is an illustration of an exemplary embodiment of the present invention wherein a memory data path unit block diagram is shown;

FIG. 9 is a depiction of an exemplary command format of the present invention; and FIG. 10 is a depiction of an exemplary response format of the present invention.

DETAILED DESCRIPTION OF THE INVENTION

Reference will now be made in detail to the presently preferred embodiments of the invention, examples of which are illustrated in the accompanying drawings.

Referring generally now to FIGS. 1 through 10, exemplary embodiments of the present invention are shown. The present invention relates to DRAM memory controllers and provides a solution to problem of defining a framework for a configurable, flexible memory controller that may be customized to work as one or several distinct memory controllers having a useful set of features.

In programmable chip platforms (e.g., field-programmable, metal-programmable, and the like) it may be desirable to place custom DRAM transceivers on the chip for connection to external DRAMs. It is also useful to place minimal controller logic for the chip IOs to manage technology-specific timing-critical aspects of DRAM. Therefore, in an embodiment of the present invention, a framework is described for a flexible set of memory controllers that are designed and pre-placed on a chip that may be configured to work as one of several distinct memory controllers. Degrees of freedom within this framework include not only the number of memory controllers in the collection of memory controllers supported, but also a variety of other aspects, including the following:

- technology type and speed of DRAM memory for each memory controller
- width and depth of the memory array for each memory controller
- memory operators supported by each memory controller
- address map of each memory controller
- type, speed, and width of interface to other logic for each memory controller
- aggregation of memory controllers/interfaces
- access models for each memory controller, e.g. packet storage, line storage, counter/statistics storage, and the like While it is recognized that prior art designs offer DRAM-specific off-chip drivers and minimal control logic (DDR coreware), higher-level memory controller logic for use in programmable platforms which supports layering and is flexible, configurable, and partitionable as provided by the present invention is not shown in the prior art. It should also be recognized by a person of ordinary skill in the art that this technique may be applied to on-chip memories where the technology is fixed but where flexible control is useful for programmable platforms.

Flexible Memory Controller

A flexible memory controller may include communicatively coupled controllers that may be configured in a variety of groupings to perform as desired. For example, a flexible memory controller may include a set of four 32-bit DDR SDRAM controllers that may be communicatively coupled, to operate in a variety of configurations. For instance, exemplary configurations for a set of four 32-bit controllers may include the following:

(A) Four 32-bit controllers;
(B) Two 64-bit controllers;
(C) One 128-bit controller; and
(D) Two 32-bit controllers and one 64 bit controller.

The following assumptions will be made for purposes of simplifying the following discussion, and are not meant to necessarily limit the scope of the present invention.

1. Operations to the same bank are not reordered.
2. Clock speeds of approximately 166–200 MHz.
3. Support for vertical and horizontal ECC. Horizontal ECC utilizes an extra memory module connected to each controller. Vertical ECC partitions the address space differently and creates regions in which to store the ECC within the data modules.
4. Programmable CAS latency with values of 2, 2.5, 3, and 4.
5. Write commands do not return a tag unless there is an error.
6. Increment commands with no return data do not return a tag unless there is an error.
7. Fence commands do not return a response.
8. Both DDR SDRAM and FC dram are supported.
9. The AHB bus is only used for register accesses, so locking and split transactions are not supported by the slave interface.

Special Functions

Beyond the typical read/write capabilities, two special operations are supported by the present invention.

Fence

A fence command forces all currently pending operations to be completed before any further operations are accepted. A fence command may be directed at a particular controller(s) or at all controllers.

Increment

An increment operation may read a value from memory, increment the value by 1, and write the incremented value back to memory. Further, the increment operation may be performed on a single 32-bit value, both 16-bit halves of a 32-bit value, and the like. The operation may optionally return the value read, but generally does not do so.

Addressing

In addition to the special functions, the controller of the present invention may also support a variety of forms of addressing for read/write commands. For example, a first addressing scheme may employ a wrapping addressing scheme in which accesses that do not start on an even burst boundary "wrap around" when the accesses reach the end of the burst address. For instance, starting an access at address 0x4 would result in accesses to 0x4, 0x8, 0xC, and 0x0.

An additional form of addressing contemplated by the present invention is sequential, in which the address continues to increment past the end of a burst. For example, an access at address 0x4 would result in accesses to 0x4, 0x8, 0xC, and 0x10. The only limitation on sequential addressing is that the addressing may not cross a 1 Kbyte boundary.

Architecture

Referring now to FIG. 1, an exemplary embodiment of a reconfigurable memory controller of the present invention is shown. In this example, four independent 32-bit wide memory controllers 102, 104, 106 & 108 are depicted. Each of the controllers 102, 104, 106 & 108 in this instance are configured to be accessed independently, and are communicatively coupled between gate array logic 110 and an I/O 112 for communicatively coupling the gate array logic 110 through use of the controllers 102, 104, 106 & 108 to external memory modules 114, 116, 118 & 120. (Add Data path PHYs)

Referring now to FIG. 2, an exemplary embodiment of a reconfigurable memory controller of the present invention is shown wherein two of the 32-bit data paths of FIG. 1 have been combined into a single 64-bit controller. The memory controllers 102 & 104 that are paired together are controlled by a single interface 122, Both Data paths are under the control of a single controller. Because the logic is implemented in metal programmable regions of the chip, the interconnection of the data path and arraignment of controllers is flexible. The PHYs 124 are implemented in precisely placed and timed diffused logic. The single interface 122 enables the gate array logic 110 to utilize the two 32-bit controllers 102 & 104 as a single 64-bit controller. The other controllers 106 & 108 are still viewable as separate 32-bit controllers.

In FIG. 3, an additional embodiment of the present invention is shown wherein the four 32-bit data paths have been combined into two 64-bit controllers. Each pair of 32-bit data paths may be controlled by corresponding interfaces 126 & 128, as described previously.

Referring now to FIG. 4, a further embodiment of the present invention is shown wherein the four 32-bit data paths of FIG. 1 have been combined into one 128-bit controller. In this instance, all four of the 32-bit data paths are controlled by one interface 126. Thus, the gate array logic utilizes the controllers 102, 104, 106 & 108 as a single controller 126.

Therefore, through use of the present invention, a reconfigurable memory controller is provided which may be tailored to the functionality desired.

Modes of Operation

When combining multiple controllers together, a variety of architected modes of operation may be employed, such as non-pipelined and pipelined.

Non-Pipelined Operation

A non-pipelined mode assumes that the interface is wired with transistors of sufficient drive strength that the flight times to/from the combined controllers are balanced. In this mode, each controller receives a same command on the same clock cycle and should respond in the same clock cycle. An example of non-pipelined operation is shown in FIG. 5.

Pipelined Operation

A pipelined mode staggers the sending of commands to each controller to allow time for the commands to reach each controller. In this mode, each controller receives the same command on a different clock cycle and responds in a different clock cycle. An example of pipelined operation is shown in FIG. 6.

Controller Overview

Control Unit

Referring now to FIG. 7, a high level flow of the controller of the present invention is shown. Each memory controller operates on commands presented to the controller by gate array logic. The commands are further discussed subsequently in the "Command/Response" section of the present discussion. Each command includes an identifying tag, opcode, and address. If the command is an increment, byte enables are also included. If the command is a write, byte enables and write data are also part of the command. For writes, half of the byte enables and write data are presented with the command and the other half are presented the cycle immediately after the write command is accepted by the controller.

Since the path through the flow is different for write and non-write commands, the commands shall be described separately. However, the use of the tag part of the command will first be described.

Tag Usage

Generally, the tags are carried through the flow to link the requester and the operation. An assumption for the present discussion is that there is an operation Y that enters the controller with tag X, and Y is expected to return data. When Y completes, the requester may be sent a response with tag X and status indicating that the data is ready to be read or that an error occurred during the operation. An operation that does not return data need only send a tag to the requester to indicate an error has occurred. The requester should not wait for a response on such an operation, but preferably will be able to handle the error response being sent.

Write Operation

When a write command is received by the command processor, two conditions should be met for the command to be accepted. First, there is space available in the command queue. Second, there is a write buffer available to store the data and the byte enables. If a write buffer is not available, the command processor will receive "Buffer Full" from the write buffer. If a buffer is available, the index of the buffer is returned.

Since a write buffer for receipt of the data is allocated upon acceptance of the command, the tag information may be stored in the corresponding entry in the write tag queue rather than the inbound tag queue. Rather than the tag, the index of the buffer is placed in the inbound tag queue so the index does not need to be looked up again when the arbiter selects the write command.

When the arbiter selects the command, the arbiter accesses the address CAM and write buffer and passes the address, write data, and byte enables to the sequencer for the bank that is the target of the command. If the command is a full write, the operation is done and the buffer may be freed. If the command is a partial write, an ECC error may occur on the read portion of the access. If an error does occur, an error response should be sent which may include the command's tag from the write tag queue. Once the error response has been sent, the buffer may be freed.

Read Operation

When the command processor receives a read command, space need only be available in the command queue. The arbiter determines buffer availability for the read data before selecting a read command from the queue. Assuming a buffer is available, the tag for the read command is taken off the inbound tag queue and placed in the read tag queue and the address and buffer index are sent to the sequencer for the appropriate bank. Once the read is complete, a response with the read command's tag is sent indicating either the data is ready to use or that an error occurred during the operation.

Data Coherency and the Address Cam

As the command processor processes each command, the address is sent to the address CAM for comparison to the addresses of already pending operations. If there is an address match, the arbiter is sent a hit signal as well as the index of the matching address. This command is processed immediately to prevent data coherency problems.

Data Interface

The DDR data interface block in FIG. 7 may be expanded as shown in FIG. 8. Four 8-bit DDR hardmacs form the 32-bit data bus plus a fifth one for ECC. The write data holding latches capture an entire burst and partitions the burst into 32-bit transfers, and also generates ECC over each 32-bit transfer. Conversely, as each 32-bit transfer is completed on a read, the read data synchronization latches verify the ECC and stores the data until the burst is complete, and then transfers the data to a read buffer.

The delay control logic contains a (for example LSI G12 technology HM20DYLDDR) master delay hardmac and monitor logic to adjust the DQS delay in each CW000701 Data path PHY Besides during initialization, it may be beneficial to adjust delays during refresh as well to account for voltage and temperature variations in the technology.

Command/Response

Format

The control interface between the system and the memory controllers is a series of commands and responses. In the present example, the commands are up to 128-bits wide and the responses are each 32-bits wide. The commands may take the general form below:

Tag

The tag is a 16-bit identifier that links the operation to its initiator and allows the response to be routed to the proper location.

Opcode

The opcode is an 8-bit value that identifies the type of operation that is being requested. Defined values may include the following:

0x10: Read with Wrapping Address
0x18: Read with Sequential Address
0x20: Write with Wrapping Address
0x28: Write with Sequential Address
0x30: Partial Write with Wrapping Address
0x38: Partial Write with Sequential Address
0x40: Increment 32 bit vale with no data returned.
0x48: Increment 32 bit value and return data.
0x50: Increment both 16 bit halves of a 32 bit value with no data returned.
0x58: Increment both 16 bit halves of a 32 bit value and return data.
0x81: Fence operation to controller 1.
0x82: Fence operation to controller 2.
0x84: Fence operation to controller 3.
0x88: Fence operation to controller 4.
0x8F: Fence operation to all controllers.

Byte Enables

"Byte enables" indicate which bytes are valid on a write. When there are multiple controllers grouped together, gate array logic routes the appropriate byte enables to each controller.

Address

The 32-bit address represents the target location of the operation.

Write Data

The write data may include 8-bytes of data that (depending on the byte enables) will be written into memory. When there are multiple controllers grouped together, gate array logic routes the appropriate data to each controller.

Return Code

The return code indicates status of a completed operation. A return code of zero means no errors. Preferably, only reads and increments that return data will ever send a response with a zero return code. The other operations do not provide a response unless an error occurs.

Buffer Index

For reads and increments that return data, the buffer index indicates to a requester which of the read buffers from which to get the requested read data. For other commands, this value may be meaningless.

Write Command

When a write command is received by the command processor, the command processor verifies that the opcode queue and the write buffer are not full. Assuming the queue and buffer are not full, the command processor accepts the command and requests a buffer from the write buffer. The write buffer allocates a buffer for the command and returns the index of the buffer to the command processor. The command processor then writes the command's data and byte enables to the allocated write buffer, the address to the address CAM, the opcode to the opcode queue, and the index of the write buffer to the inbound tag queue.

When the arbiter selects the operation, the arbiter passes the address, opcode and write buffer index to the appropriate bank sequencer. The sequencer schedules the commands to the DDR with appropriate timings and directs data from the write data buffer at the proper time. If performing a partial write, the sequencer first schedules a read command. Once the read data has been captured, the read command is merged with the write data, a new ECC is generated, and the new data and ECC are written out to memory.

Read Command

When a read command is received by the command processor, the command processor verifies that the opcode queue is not full. Assuming the queue is not full; the command processor accepts the read command and writes the command's address to the address CAM, the opcode to the opcode queue, and the tag to the inbound tag queue.

When the arbiter attempts to select the operation, the arbiter first verifies that there is available space in the read buffer. Assuming there is space, the arbiter requests a buffer, and the read buffer returns the index of the read buffer allocated. Once the buffer is allocated, the arbiter passes the address, opcode, and buffer index to the appropriate bank sequencer and writes the tag into the tag queue at the same index as the buffer allocated. The sequencer schedules the commands to the DDR with appropriate timings and directs the data from the DDR to the read data buffer at the proper time.

Fence Command

When a fence command is received, the command processor stops accepting commands until the opcode queue has been completely emptied. Once the queue is empty, command acceptance resumes.

Increment Command

An increment command that does not return data is very similar to a partial write. However, when the address is read, rather than merging in data from the write queue, the read data is fed through an incrementer and written back out. Preferably, each sequencer will have the incrementers necessary to implement the function and will not require the allocation of a write buffer.

If the increment command does return data, performance of the increment command is still very similar to a partial write, but with three exceptions. First, a read buffer is allocated for the return data before the operation is sent to the appropriate bank sequencer. Second, the data read is routed to both the incrementer and the allocated read buffer. Finally, a response is sent to the requester to indicate availability of the data in the read buffer.

Register

Each controller may include a copy of the registers as described in the following sections.

Register Type Conventions

Clear/Set (C/S) Register

Writing to the Clear address causes all bits written to a b'1' to be cleared. Writing to the Set address causes all bits written to a b'1' to be set. The register may be read from either address. The value of this Clear/Set capability is that code written for this controller does not have to perform read/modify/write operations to change register bits.

Read/Write (R/W) Register

These registers have a single address that may be read or written.

Read Only (R) Register

These registers may only be read.

Control Register

This register controls how the memory controller operates.

| Address Offset (Clear): | 0x 0000 |
| Address Offset (Set): | 0x 0004 |
| Reset Value: | 0x 0000 0000 |
| Register Type: | Clear/Set |

| Bit(s) | Type | Description |
| --- | --- | --- |
| 31:16 | R | Reserved. |
| 15 | C/S | ECC Enable. When set to a b'1', ECC will be generated on writes and checked on reads. When set to a b'0', generation or checking will not be done. |
| 14 | C/S | Vertical ECC. When set to a b'1', the ECC will be vertical, i.e. regions of the DRAM address space will be dedicated to ECC storage. When set to a b'0', ECC will be horizontal, i.e. ECC is stored in a separate DRAM module from the data. |
| 13 | C/S | Capture ECC SBE Address. When set to a b'1', the address of any ECC single bit error (SBE) will be captured in the Memory Error Address Register. When set to a b'0', only the address of multi-bit errors will be captured. See "Memory Error Address Register" on page 22 for more information. |

-continued

| 12 | C/S | Capture First Error Address Only: When set to a b'1', the Memory Error Address Register will capture the address of the first memory error. When set to a b'0', the Memory Error Address Register will continuously update with the most current error address. |
| 11 | C/S | Init Mode. When set to a b'1', this bit allows the address and control pins of the external memory bus to be driven by the bits of the Init Sequence Register. When this bit is b'0', internal state machines control the pin. |
| 10 | C/S | CKE Control. This bit directly drives the CKE(PD for FCRAM) pin on the DDRs. |
| 9 | C/S | Serialize Operations: When set to a b'1', the arbiter will remove operations from the opcode queue in the order received and will wait for each to finish before starting another. When set to a b'0', the arbiter will attempt to optimize accesses and overlap them as much as possible. |
| 8 | C/S | FCRAM. When set to a b'1', DDR fast cycle RAM is connected to the controller. When set to a b'0', standard DDR SDRAM is attached. |
| 7 | C/S | Auto Precharge Address Bit. When set to a b'1', dram address bit 8 will be used for auto precharge as used by graphics DDRs. When set to a b'0', address bit 10 is used. This bit has no effect if using FCRAM. |
| 6:4 | C/S | Column Address Bits. Determines how many address bits are used for the column address on a DDR SDRAM or for the lower address of a DDR FCRAM. These bits decode to:<br>b"000" - 7<br>b"001" - 8<br>b"010" - 9<br>b"011" - 10 |
| 1:0 | C/S | Memory Size. These bits indicate how much memory is connected to the controller. These bits decode to:<br>b"00" - 32 MBytes<br>b"01" - 64 MBytes<br>b"10" - 128 MBytes<br>b"11" - 256 MBytes |

Status Register

This register captures significant error events that occur in the controller. When the corresponding bit in the Interrupt Enable Register is a b'1', an interrupt is generated.

| Address Offset (Clear): | 0x 0008 |
| Address Offset (Set): | 0x 000C |
| Reset Value: | 0x 0000 0000 |
| Register Type: | Clear/Set |

| Bit(s) | Type | Description |
| --- | --- | --- |
| 1 | C/S | Correctable ECC Error. A single bit ECC error has occurred. |
| 0 | C/S | Uncorrectable ECC Error. A multi-bit ECC error has occurred. |

Interrupt Enable Register

The bits of this register are identical to the bits in the Status Register. When a bit in this register is a b'1' and the corresponding bit in the Status Register is also a b'1', an interrupt is generated.

| Address Offset (Clear): | 0x 0010 |
| Address Offset (Set): | 0x 0014 |
| Reset Value: | 0x 0000 0000 |
| Register Type: | Clear/Set |

Control Register Write Enable Register

This register is designed to prevent accidental alteration of the Control Register.

| | |
|---|---|
| Address Offset: | 0x 0018 |
| Reset Value: | 0x 0000 0000 |
| Register Type: | Read/Write |

| Bit(s) | Type | Description |
|---|---|---|
| 31:8 | R | Reserved. |
| 7:0 | R/W | Control Register Write Enable. These bits are written to x"B4" before the Control Register may be written. |

ECC Syndrome Register

This register logs the syndrome (error pattern) of the last ECC error.

| | |
|---|---|
| Address Offset: | 0x 001C |
| Reset Value: | 0x 0000 0000 |
| Register Type: | Read/Write |

| Bit(s) | Type | Description |
|---|---|---|
| 31:7 | R | Reserved. |
| 6–0 | R/W | Syndrome Bits. These bits indicate which bit was in error on a single bit ECC error and/or indicate the pattern that triggered an uncorrectable error. If the error was a correctable, single bit error, the "ECC Syndrome Table" may be used to determine which bit was in error. |

ECC ALGORITHM TABLE

| | Data Bit | | | | | | | | | | | | | | | |
|---|---|---|---|---|---|---|---|---|---|---|---|---|---|---|---|---|
| ECC Bit | 31 | 30 | 29 | 28 | 27 | 26 | 25 | 24 | 23 | 22 | 21 | 20 | 19 | 18 | 17 | 16 |
| 6 | 0 | 0 | 0 | 0 | 0 | 0 | 0 | 0 | 1 | 1 | 1 | 1 | 1 | 1 | 1 | 1 |
| 5 | 1 | 0 | 0 | 0 | 0 | 1 | 0 | 0 | 0 | 0 | 0 | 0 | 0 | 0 | 0 | 0 |
| 4 | 0 | 1 | 0 | 0 | 1 | 0 | 1 | 0 | 1 | 0 | 0 | 0 | 0 | 1 | 1 | 1 |
| 3 | 0 | 0 | 1 | 0 | 1 | 0 | 0 | 1 | 0 | 1 | 1 | 0 | 0 | 1 | 0 | 0 |
| 2 | 0 | 0 | 0 | 1 | 0 | 1 | 1 | 1 | 0 | 1 | 0 | 1 | 0 | 0 | 1 | 0 |
| 1 | 1 | 1 | 1 | 1 | 1 | 1 | 1 | 1 | 0 | 0 | 1 | 1 | 1 | 0 | 0 | 1 |
| 0 | 1 | 1 | 1 | 1 | 0 | 0 | 0 | 0 | 1 | 0 | 0 | 0 | 1 | 0 | 0 | 0 |

| | Data Bit | | | | | | | | | | | | | | | |
|---|---|---|---|---|---|---|---|---|---|---|---|---|---|---|---|---|
| ECC Bit | 15 | 14 | 13 | 12 | 11 | 10 | 9 | 8 | 7 | 6 | 5 | 4 | 3 | 2 | 1 | 0 |
| 6 | 0 | 0 | 0 | 1 | 0 | 0 | 0 | 1 | 0 | 0 | 0 | 0 | 1 | 1 | 1 | 1 |
| 5 | 1 | 0 | 0 | 1 | 1 | 1 | 0 | 0 | 1 | 1 | 1 | 1 | 1 | 1 | 1 | 1 |
| 4 | 0 | 1 | 0 | 0 | 1 | 0 | 1 | 0 | 1 | 1 | 1 | 0 | 1 | 0 | 0 | 0 |
| 3 | 0 | 0 | 1 | 0 | 0 | 1 | 1 | 0 | 1 | 0 | 0 | 1 | 0 | 1 | 0 | 0 |
| 2 | 1 | 1 | 1 | 0 | 0 | 0 | 0 | 1 | 0 | 1 | 0 | 1 | 0 | 0 | 1 | 0 |
| 1 | 0 | 0 | 0 | 0 | 0 | 0 | 0 | 0 | 0 | 0 | 1 | 0 | 0 | 0 | 0 | 1 |
| 0 | 1 | 1 | 1 | 1 | 1 | 1 | 1 | 1 | 0 | 0 | 0 | 0 | 0 | 0 | 0 | 0 |

| Bit | Syndrome | Bit | Syndrome | Bit | Syndrome | Bit | Syndrome |
|---|---|---|---|---|---|---|---|
| 31 | 0100011 | 23 | 1010001 | 15 | 0100101 | 7 | 0111000 |
| 30 | 0010011 | 22 | 1001100 | 14 | 0010101 | 6 | 0110100 |
| 29 | 0001011 | 21 | 1001010 | 13 | 0001101 | 5 | 0110010 |
| 28 | 0000111 | 20 | 1000110 | 12 | 1100001 | 4 | 0101100 |
| 27 | 0011010 | 19 | 1000011 | 11 | 0110001 | 3 | 1110000 |
| 26 | 0100110 | 18 | 1011000 | 10 | 0101001 | 2 | 1101000 |
| 25 | 0010110 | 17 | 1010100 | 9 | 0011001 | 1 | 1100100 |
| 24 | 0001110 | 16 | 1010010 | 8 | 1000101 | 0 | 1100010 |
| ECC(6) | 1000000 | ECC(4) | 0010000 | ECC(2) | 0000100 | ECC(0) | 0000001 |
| ECC(5) | 0100000 | ECC(3) | 0001000 | ECC(1) | 00000010 | | |

ECC Inversion Register

The ECC inversion register allows the selective inversion of ECC bits for testing purposes. An example use of this register would be to set this register to:
1. Write a particular syndrome value to this register.
2. Write zero to a location in memory.
3. Read the memory back.
4. The data read should have the bit corresponding to the syndrome flipped to a b'1'.

| | |
|---|---|
| Address Offset: | 0x 0020 |
| Reset Value: | 0x 0000 0000 |
| Register Type: | Read/Write |

| Bit(s) | Type | Description |
|---|---|---|
| 31:7 | R | Reserved. |
| 6–0 | R/W | ECC Inversion Bits. When a bit in this register is set to a b'1', the corresponding outgoing ECC bit is inverted. Bit 6 corresponds to ECC bit 6, etc. |

ECC SBE Count Register

The ECC SBE count register counts the number of single bit errors that have occurred.

| | |
|---|---|
| Address Offset: | 0x 0024 |
| Reset Value: | 0x 0000 0000 |
| Register Type: | Read/Write |

| Bit(s) | Type | Description |
|---|---|---|
| 31:16 | R | Reserved. |
| 15–0 | R/W | ECC Single Bit Error Count. Tally of single bit errors that have occurred in this controller since this register was last cleared. |

Memory Error Address Register

This register contains the address of the last captured memory error. Which error is the last captured memory error is based on the setting of bits 13:12 of the Control Register. If bit 13 is a b'1', the address of any ECC error is captured; if bit 13 is a b'0', then only multibit ECC errors will be captured. If bit 12 is a b'1', the address captured is from the first memory error that occurred based on the value of bit 13; if bit 12 is a b'0', the address captured is from the latest error.

| Bit(s) | Type | Description |
|---|---|---|
| 31–0 | R | Error Address. The address of the last captured memory error. |

Init Sequence Register

This register is used to drive the address and control signals of the DDR so that software may perform the required initialization sequence for the DDR. When this register is written, the value written is placed on the DDR bus for 1 cycle.

| | |
|---|---|
| Address Offset: | 0x 002C |
| Reset Value: | 0x 0000 0000 |
| Register Type: | Read/Write |

| Bit(s) | Type | Description |
|---|---|---|
| 31:24 | R | Reserved. |
| 23 | R/W | CS. This bit is driven on the DDR chip select pin. |
| 22 | R/W | RAS. This bit is driven on the DDR row address strobe. |
| 21 | R/W | CAS. This bit is driven on the DDR column address strobe. |
| 20 | R/W | WE. This bit is driven on the DDR write enable (FN for FCRAM) pin. |
| 19:18 | R | Reserved. |
| 17–16 | R/W | Bank Address. These bits are driven on the DDR bank address lines. |
| 15 | R | Reserved. |
| 14–0 | R/W | Address. These bits are driven on the DDR address bus. |

Timing Parameter Register

This register defines the timings to use for the controller. The default value of this register is for PC333 and a CAS latency of 2.5. The timing parameter register may be used to implement an adjustable DRAM timing method, a further discussion of which may be found in U.S. Pat. No. 6,438,670, which is herein incorporated by reference in its entirety.

| | |
|---|---|
| Address Offset: | 0x 0030 |
| Reset Value: | 0x 0001 45BA |
| Register Type: | Read/Write |

| Bit(s) | Type | Description |
|---|---|---|
| 31:20 | R | Reserved. |
| 19:16 | R/W | CAS Latency. These bits define the number of cycles between a read command and read data being valid. A value of x'0' yields a CAS latency of 2 cycles and each increment of these bits adds a half cycle. |
| 15–12 | R/W | Write to Read Time. The number of cycles between a read and write to 2 different banks. |
| 11–8 | R/W | Read to Write Time. The number of cycles between a read and write to 2 different banks. |
| 7–4 | R/W | Refresh Random Cycle Time ($t_{REFC}$ or $I_{REFC}$). The number of cycles between a DDR SDRAM refresh command and a bank activate, or the number of cycles between a FCRAM refresh command and a WRA or RDA command. |
| 3–0 | R/W | Random Cycle Time ($t_{RC}$ or $I_{rc}$). The number of cycles between DDR SDRAM bank activate commands to the same bank, or the number of cycles between FCRAM WRA or RDA commands to the same bank. |

Debug Registers

The following registers allow an AHB slave interface to inject commands into the command processor. Injected commands have a predefined tag of 0xTBD as identification so that the response is sent to proper location.

Injection Control Register

This register contains the tag, opcode, and byte enables (if needed) of a command being injected into the controller.

| | |
|---|---|
| Address Offset: | 0x 0040 |
| Reset Value: | 0x 0000 0000 |
| Register Type: | Read/Write |

| Bit(s) | Type | Description |
|---|---|---|
| 31:2 | R | Reserved. |
| 1 | R/W | Read Returned Read Buffer. Setting this bit causes the buffer indicated by bits 15:8 of the Injection Response Register to be read and stored in the data injection registers. This bit will be automatically cleared when the read completes. |
| 0 | R/W | Inject Command. Inject into the command processor the command indicated by the injection register. This bit will be automatically cleared once the operation is accepted. |

Injection Response Register

This register captures any response sent back for an injected command.

| | |
|---|---|
| Address Offset: | 0x 0044 |
| Reset Value: | 0x 0000 0000 |
| Register Type: | Read/Write |

| Bit(s) | Type | Description |
|---|---|---|
| 31:16 | R/W | Return TAG. The identifying tag for the completed operation. |
| 15:8 | R/W | Return Code. The return code of the completed operation. |
| 7:0 | R/W | Return Buffer Index. Buffer index at which to find data returned by the operation. |

Tag/Opcode/Byte Enable Injection Register

This register contains the tag, opcode, and byte enables (if needed) of a command being injected into the controller.

| | |
|---|---|
| Address Offset: | 0x 0048 |
| Reset Value: | 0x 0000 0000 |
| Register Type: | Read/Write |

| Bit(s) | Type | Description |
|---|---|---|
| 31:16 | R/W | Injected TAG. The identifying tag for this operation. |
| 15–8 | R/W | Injected Opcode. The opcode for this operation. |
| 7–0 | R/W | Injected Byte Enables. If doing an operation that requires byte enables, these bits define what they are. |

Address Injection Register

This register sets the address of an operation injected into the controller by software.

| | |
|---|---|
| Address Offset: | 0x 004C |
| Reset Value: | 0x 0000 0000 |
| Register Type: | Read/Write |

| Bit(s) | Type | Description |
|---|---|---|
| 31–0 | R/W | Injected Address. Address of operation injected into the controller. |

Upper Data Injection Register

This register contains bits 128–96 of any data written/read by an injected command.

| | |
|---|---|
| Address Offset: | 0x 0050 |
| Reset Value: | 0x 0000 0000 |
| Register Type: | Read/Write |

| Bit(s) | Type | Description |
|---|---|---|
| 31–0 | R/W | Upper Data. Bytes 0–3 of a 16 byte burst. |

Upper Middle Data Injection Register

This register contains bits 95–72 of any data written/read by an injected command.

| | |
|---|---|
| Address Offset: | 0x 0054 |
| Reset Value: | 0x 0000 0000 |
| Register Type: | Read/Write |

| Bit(s) | Type | Description |
|---|---|---|
| 31–0 | R/W | Upper Middle Data. Bytes 4–7 of a 16 byte burst. |

Lower Middle Data Injection Register This register contains bits 63–32 of any data written/read by an injected command.

| | |
|---|---|
| Address Offset: | 0x 0058 |
| Reset Value: | 0x 0000 0000 |
| Register Type: | Read/Write |

| Bit(s) | Type | Description |
|---|---|---|
| 31–0 | R/W | Lower Middle Data. Bytes 8–11 of a 16 byte burst. |

Lower Data Injection Register

This register contains bits 31–0 of any data written/read by an injected command.

| | |
|---|---|
| Address Offset: | 0x 005C |
| Reset Value: | 0x 0000 0000 |
| Register Type: | Read/Write |

| Bit(s) | Type | Description |
|---|---|---|
| 31–0 | R/W | Lower Data. Bytes 12–15 of a 16 byte burst. |

Module I/O

The I/O of an exemplary controller is listed in the table below.

| Name | Direction | Description |
|---|---|---|
| | | General I/O |
| clk1x | IN | System clock running at DDR clock speed. |
| clk2x | IN | System clock running at twice DDR clock speed. |
| Reset | IN | System reset. |
| test_io - number unknown | EITHER | TBD. |
| | | AMBA Bus I/O |
| hsel | IN | Controller select. |
| haddr(31:0) | IN | Register address. |
| hwrite | IN | Write data. |
| htrans(1:0) | IN | Transaction type. |
| hsize(1:0) | IN | Transaction size. |
| hburst(2:0) | IN | Burst. |
| hwdata(31:0) | IN | Write data. |
| hready | OUT | Indicates transaction ready or is used to insert wait states. |
| hresp(1:0) | OUT | Slave response to transaction. |
| hrdata(31:0) | OUT | Read data. |
| | | Command I/O |
| mem_req | IN | Memory operation request. Should remain on until mem_ack indicates the operation is acknowledged. |
| mem_address (31:0) | IN | Address of memory operation. |
| mem_tag (15:0) | IN | Unique tag to identify memory operation. |
| mem_byte_enab(7:0) | IN | Byte enables for memory operation (if necessary). |
| mem_opcode (7:0) | IN | Encoded description of memory operation. |
| mem_write_data(63:0) | IN | Write data for memory operation (if necessary). |
| mem_accept (1:0) | OUT | Indication to requester of the types of operations that the controller may currently accept. Preferably, fence commands may always be accepted. b"00" - Any operation b"01" - Read/Increment operations only b"10" - Write operations only b"11" - No operations |
| mem_ack | OUT | The currently requested operation was accepted. |
| | | Response I/O |
| response_valid | OUT | Signal indicating that response_tag, response_rc, and response_index are valid. |
| response_tag(15:0) | OUT | Unique tag to identify completed memory operation. |
| response_rc (7:0) | OUT | Return code for the response. |
| response_index(7:0) | OUT | Buffer index related to the response (if necessary). |
| response_ack | IN | Indication that the response information has been captured by the requester logic. |
| read_req | IN | Request to extract read data from read buffers. |
| read_index (7:0) | IN | Index of buffer that is to be read. |
| read_data (63:0) | OUT | Read data. 128 bits of data may be presented on 2 consecutive cycles. |
| read_data_ack | OUT | Returned with read data to indicate it is valid. Valid for 2 consecutive cycles. |
| | | External Memory I/O |
| ddr_address (14:0) | OUT | Address to the external memory. |
| ddr_bank_address(1:0) | OUT | Bank address to the external memory. |
| ddr_cs_n | OUT | Low active chip select to the external memory. |
| ddr_ras_n | OUT | Low active row address strobe to the external memory. |
| ddr_cas_n | OUT | Low active column address strobe to the external memory. |
| ddr_we_n | OUT | Low active write enable to the external memory. In the case of FCRAM, this is the FN pin. |
| ddr_dm (3:0) | OUT | Data mask to external memory. When driven high on writes, data is masked (not written) to external memory. |
| ddr_data_out(38:0) | OUT | Data to be sent to the external memory. |
| ddr_data_in(38:0) | IN | Data coming from the external memory. |
| ddr_data_drv_enab | OUT | Driver enable for data. |
| ddr_dqs_out(3:0) | OUT | Data qualification strobe to the external memory. |
| ddr_dqs_in(3:0) | IN | Data qualification strobe from the external memory. |
| ddr_dqs_drv_enab | OUT | Driver enable for DQS. |
| ddr_cke | OUT | Clock enable for external memory. In the case of FCRAM, this is the PD pin. |
| ddr_clk? | OUT | Positive differential clock to external memory. |
| ddr_clk_n | OUT | Negative differential clock to external memory. |

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various step in a sample order, and are not meant to be limited to the specific order or hierarchy presented.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A reconfigurable memory controller, comprising:
    a plurality of communicatively coupled memory controllers implemented as configurable logic, wherein the plurality of communicatively coupled memory controllers are reconfigurable so that the memory controllers are configurable into a first memory configuration and reconfigurable into a second memory configuration, the first memory configuration having a different bandwidth grouping than the second memory configuration.

2. The reconfigurable memory controller as described in claim 1, wherein at least one of the plurality of communicatively coupled memory controllers is communicatively coupled to an external memory.

3. The reconfigurable memory controller as described in claim 1, wherein at least one of a width or a depth of a memory array for a first memory controller included in the plurality of memory controllers is different from a second memory controller included in the plurality of memory controllers.

4. The reconfigurable memory controller as described in claim 1, wherein memory operations supported by a first memory controller included in the plurality of memory controllers are different from memory operations supported by a second memory controller included in the plurality of memory controllers.

5. The reconfigurable memory controller as described in claim 1, wherein at least one of a type, or speed of logic interface of a first memory controller included in the plurality of memory controllers is different from a second memory controller included in the plurality of memory controllers.

6. A reconfigurable memory controller, comprising:
a plurality of communicatively coupled memory controllers including a first memory controller, a second memory controller, and a third memory controller, wherein the plurality of communicatively coupled memory controllers are reconfigurable so that the first memory controller and the second memory controller are groupable into a first memory configuration, and the first memory controller and the third memory controller are groupable into a second memory configuration, the first memory configuration being different from the second memory configuration.

7. The reconfigurable memory controller as described in claim 6, wherein at least one of the plurality of communicatively coupled memory controllers is communicatively coupled to an external memory.

8. The reconfigurable memory controller as described in claim 6, wherein at least one of a width or a depth of a memory array for the first memory controller is different from the second memory controller.

9. The reconfigurable memory controller as described in claim 6, wherein memory operations supported by the first memory controller are different than memory operations supported by the second memory controller.

10. The reconfigurable memory controller as described in claim 6, wherein at least one of a type or a speed of logic interface of the first memory controller is different than the second memory controller.

11. A system, comprising:
a reconfigurable memory controller including a plurality of communicatively coupled memory controllers, wherein the plurality of communicatively coupled memory controllers are flexibly configurable so that the memory controllers are configurable into a first memory configuration and reconfigurable into a second memory configuration, the first memory configuration having a different bandwidth grouping than the second memory configuration; and
an external memory communicatively coupled to the reconfigurable memory controller, wherein the reconfigurable memory controller is suitable for controlling operations of the external memory.

12. The system as described in claim 11, wherein the reconfigurable memory controller is communicatively coupled to an external memory.

13. The system as described in claim 11, wherein at least one of a width or a depth of a memory array for a first memory controller included in the plurality of memory controllers is different from a second memory controller included in the plurality of memory controllers.

14. The system as described in claim 11, wherein memory operations supported by a first memory controller included in the plurality of memory controllers are different than memory operations supported by a second memory controller included in the plurality of memory controllers.

15. The system as described in claim 11, wherein at least one of a type, or a speed of logic interface of a first memory controller included in the plurality of memory controllers is different than a second memory controller included in the plurality of memory controllers.

16. A method for reconfiguring a memory controller to support different configurations, comprising:
providing a reconfigurable memory controller having a plurality of communicatively coupled memory controllers, the plurality of memory controllers being groupable;
configuring the plurality of communicatively coupled memory controllers into a first memory configuration, the first memory configuration having a first grouping of memory controllers and a second grouping of memory controllers, the first grouping of memory controllers having a first bandwidth and the second grouping of memory controllers having a second bandwidth; and
reconfiguring the plurality of communicatively coupled memory controllers into a second memory configuration, the second memory configuration having a third grouping of memory controllers and a fourth grouping of memory controllers, the third grouping of memory controllers having a third bandwidth and the fourth grouping of memory controllers having a fourth bandwidth,
wherein the bandwidths as grouped by the first grouping and the second grouping of the first memory configuration are different from the bandwidths of the third grouping and the fourth grouping of the second memory configuration.

17. The method as described in claim 16, wherein the reconfigurable memory controller is communicatively coupled to an external memory.

* * * * *